United States Patent
Elsässer

(10) Patent No.: US 8,701,637 B2
(45) Date of Patent: Apr. 22, 2014

(54) INTERNAL COMBUSTION ENGINE EXHAUST GAS RECIRCULATION APPARATUS AND METHOD OF OPERATION

(75) Inventor: Alfred Elsässer, Keltern (DE)

(73) Assignee: Mahle International GmbH (DE)

( * ) Notice: Subject to any disclaimer, the term of this patent is extended or adjusted under 35 U.S.C. 154(b) by 282 days.

(21) Appl. No.: 12/965,400

(22) Filed: Dec. 10, 2010

(65) Prior Publication Data

US 2011/0139134 A1 Jun. 16, 2011

(30) Foreign Application Priority Data

Dec. 12, 2009 (DE) .......................... 10 2009 058 130

(51) Int. Cl.
*F02M 25/07* (2006.01)

(52) U.S. Cl.
USPC ................. 123/568.18; 123/568.23; 60/605.2

(58) Field of Classification Search
USPC ............ 123/568.11, 568.17–568.3, 698, 337, 123/339.25, 399, 559.1, 568.12; 701/108; 60/291, 312, 605.2, 324; 137/625.15, 137/625.46, 625.47, 876
See application file for complete search history.

(56) References Cited

U.S. PATENT DOCUMENTS

| | | | |
|---|---|---|---|
| 5,146,754 A * | 9/1992 | Jain et al. .......................... | 60/602 |
| 5,690,070 A * | 11/1997 | Wendel et al. ............ | 123/339.25 |
| 5,937,834 A * | 8/1999 | Oto ........................... | 123/568.18 |
| 6,062,205 A * | 5/2000 | Bevan et al. .............. | 123/568.24 |
| 6,945,235 B1 | 9/2005 | Bertilsson et al. | |
| 7,043,914 B2 * | 5/2006 | Ishikawa ....................... | 60/605.2 |
| 7,617,678 B2 * | 11/2009 | Joergl et al. ................... | 60/605.2 |
| 8,127,796 B2 * | 3/2012 | Bonanno ........................ | 137/876 |
| 2004/0074480 A1 | 4/2004 | Chen et al. | |
| 2005/0145229 A1 * | 7/2005 | Eriksson et al. .......... | 123/568.12 |
| 2005/0188967 A1 * | 9/2005 | Altenschmidt et al. .. | 123/568.18 |
| 2007/0289582 A1 * | 12/2007 | Elsasser et al. ........... | 123/568.21 |
| 2008/0000460 A1 * | 1/2008 | Hertweck et al. .......... | 123/559.1 |
| 2009/0183509 A1 * | 7/2009 | Joergl ........................... | 60/605.2 |

(Continued)

FOREIGN PATENT DOCUMENTS

| | | |
|---|---|---|
| DE | 102005025904 A1 | 12/2006 |
| DE | 102007003116 A1 | 7/2008 |

(Continued)

OTHER PUBLICATIONS

English abstract provided for DE-102005025904.

(Continued)

*Primary Examiner* — Stephen K Cronin
*Assistant Examiner* — John Zaleskas
(74) *Attorney, Agent, or Firm* — Rader, Fishman & Grauer PLLC

(57) ABSTRACT

An internal combustion engine system includes a fresh air system, an exhaust gas system and an exhaust gas recirculation system. The exhaust gas recirculation system has an exhaust gas valve assembly for controlling a removal flow at a recirculation line removal point and a fresh air valve assembly for controlling an introduction flow at a fresh air line introduction point. The exhaust gas valve assembly is permanently displaceable between a first position and a second position for generating the removal flow. The fresh air valve assembly is permanently displaceable between a first position and a second position for generating the introduction flow. The valve assemblies are synchronized such that the positive pressure pulses entering at the removal point into the recirculation line meet the negative pressure pulses at the introduction point.

28 Claims, 4 Drawing Sheets

(56) References Cited

U.S. PATENT DOCUMENTS

2010/0132357 A1* 6/2010 Elsasser et al. ............. 60/605.2
2010/0288955 A1* 11/2010 Bonanno ..................... 251/209

FOREIGN PATENT DOCUMENTS

| EP | 1712760 | A2 | 10/2006 |
| WO | WO 2008086939 | A1 * | 7/2008 |
| WO | WO-2008/145503 | A1 | 12/2008 |
| WO | WO 2008145502 | A1 * | 12/2008 |
| WO | WO 2008145503 | A1 * | 12/2008 |

OTHER PUBLICATIONS

European Search Report for EP-10193473.5.

* cited by examiner

INTERNAL COMBUSTION ENGINE EXHAUST GAS RECIRCULATION APPARATUS AND METHOD OF OPERATION

CROSS-REFERENCES TO RELATED APPLICATION

This application claims priority to German patent application DE 10 2009 058 130.8 filed on Dec. 12, 2009, which is hereby incorporated by reference in its entirety.

TECHNICAL FIELD

The present invention relates to an internal combustion engine system, in particular of a motor vehicle, and an associated operating method.

BACKGROUND

A usual internal combustion engine system comprises an internal combustion engine, in particular a piston engine, a fresh air system for supplying fresh air to the internal combustion engine, an exhaust gas system for discharging exhaust gas from the internal combustion engine and an exhaust gas recirculation system for recirculating exhaust gas from the exhaust gas system to the fresh air system. The driving force for the exhaust gas recirculation is a pressure gradient between a removal point via which exhaust gas from an exhaust gas line flows into a recirculation line, and an introduction point via which the recirculated exhaust gas flows from the recirculation line into a fresh air line. In order to be able to control the removal flow entering into the recirculation line, the exhaust gas recirculation system can be equipped with an exhaust gas valve assembly. Such an exhaust gas valve assembly can principally be arranged in the exhaust gas line downstream of the removal point to generate a bottleneck in the exhaust gas flow by reducing the penetratable cross-section, which bottleneck increases the pressure in the exhaust gas upstream of the exhaust gas valve assembly. As a result, the pressure difference between removal point and introduction point increases, which increases the recirculatable exhaust gas quantity. For this purpose it is usual to stationarily set a desired recirculation flow or recirculation rate by means of the exhaust gas valve assembly working as throttle valve by bringing the exhaust gas valve assembly in a permanent, thus, stationary position which results in the desired exhaust gas recirculation rate. As soon as another exhaust gas recirculation rate is desired, the exhaust gas valve assembly is brought accordingly into another position which it then maintains again stationarily and which results in the desired EGR rate.

SUMMARY

The present invention is concerned with the problem to provide for an internal combustion engine system and for an associated operating method, an improved embodiment which is in particular characterized by an increased efficiency.

This problem is solved according to the invention by the subject matters of the independent claims. Advantageous embodiments are subject matter of the dependent claims.

The invention is based on the general idea to provide, in addition to the exhaust gas valve assembly arranged on the exhaust gas side, a fresh air valve assembly arranged on the fresh air side by means of which the introduction flow entering via the introduction point into the fresh air line can be controlled. By reducing the penetratable cross-section of the fresh air line upstream of the introduction point, the pressure downstream of the fresh air valve assembly can be reduced, which increases the pressure difference between removal point and introduction point. The invention proposes in addition to operate the exhaust gas valve assembly and the fresh air valve assembly not stationarily but dynamically, namely in such a manner that the respective valve assembly is permanently displaced, e.g., between a closed position and an open position. Due to the alternating opening and closing of the respective line, positive pressure pulses are generated on the exhaust gas side with a pressure which is increased with respect to an initial exhaust gas pressure, while, at the same time, negative pressure pulses are generated on the fresh air side with a pressure which is reduced with respect to an initial fresh air pressure. Moreover, the two valve assemblies are specifically synchronized in such a manner that the positive pressure pulses generated in the region of the removal point meet via the recirculation line, the negative pressure pulses generated in the region of the introduction point. In other words, a positive pressure pulse which is transferred from the exhaust gas side via the recirculation line to the fresh air side meets precisely one negative pressure pulse on the fresh air side. This results in that the pressure remains largely constant on the fresh air side because the pressure drop due to the negative pressure pulses is always more or less compensated by the timely arriving positive pressure pulses of the recirculated exhaust gas. This results in reduced pressure fluctuations on the fresh air side downstream of the introduction point. Overall, the pressure thus can be stabilized on the fresh air side which has a positive effect on the efficiency and the operational behavior of the internal combustion engine.

Of particular importance is this approach or this structure for a supercharged internal combustion engine in connection with a low-pressure exhaust gas recirculation. In such a LP exhaust gas recirculation or LP-EGR, the introduction point is upstream of a compressor of an exhaust gas turbo charger. By the exhaust gas recirculation proposed herein, the compressor receives an inflow which is stabilized with respect to the pressure, whereby a compressor impeller is more uniformly loaded and has a higher efficiency. Via the common drive shaft, this has also an effect on the turbine of the exhaust gas turbo charger, whereby also the turbine is subjected to lower loads or load fluctuations.

Advantageously, the synchronization of the valve assemblies for achieving a pressure curve as "smooth" as possible upstream of the compressor and for generating an EGR mass flow as high as possible takes place under the basic condition that for consumption reasons, the pressure loss is to be reduced as far as possible.

According to an advantageous embodiment, the positive pressure pulses can be generated by alternatingly opening and reducing or by alternatingly opening and blocking the exhaust gas line downstream of the removal point. In this case, the exhaust gas valve assembly is configured as shut-off valve or retaining valve. The negative pulses too can be generated by alternatingly reducing and opening or by alternatingly blocking and opening the fresh air line upstream of the introduction point. Then, the fresh air valve assembly also works as shut-off valve. Hereby, the exhaust gas recirculation can be implemented in a comparatively inexpensive manner. However, it is not possible to set arbitrary exhaust gas rates so that it can be required to arrange a further valve in the recirculation line, for example, to block the exhaust gas recirculation for a full load operation of the internal combustion engine.

Alternatively, it is also possible to generate the positive pressure pulses by alternatingly redirecting at least a portion of the exhaust gas flow from the exhaust gas line into the recirculation line. In this case, the exhaust gas valve assembly works as 3/2 directional control valve. Furthermore, it is also possible to generate the negative pressure pulses by alternatingly replacing at least a portion of the fresh air flow in the fresh air line with recirculated exhaust gas. In this case, the fresh air valve assembly works as 3/2 directional control valve. With such an approach, it is possible to set virtually any exhaust gas recirculation quantity. It is in particular possible to eliminate an additional valve assembly in the recirculation line because the EGR rate can be set to the value zero. Likewise, it is possible with such an embodiment to convey the entire exhaust gas from the exhaust gas side via the recirculation line to the fresh air side.

Further important features and advantages arise from the sub-claims, from the drawings, and from the associated description of the figures based on the drawings.

It is to be understood that the above mentioned features and the features yet to be explained hereinafter can be used not only in the respectively mentioned combination but also in other combinations or alone without departing from the context of the present invention.

BRIEF DESCRIPTION OF THE DRAWING

Preferred exemplary embodiments of the invention are illustrated in the drawings and are explained in the following description in more detail, wherein identical reference numbers refer to identical, or similar, or functionally identical components.

In the figures, schematically.

DETAILED DESCRIPTION

Figure 1:
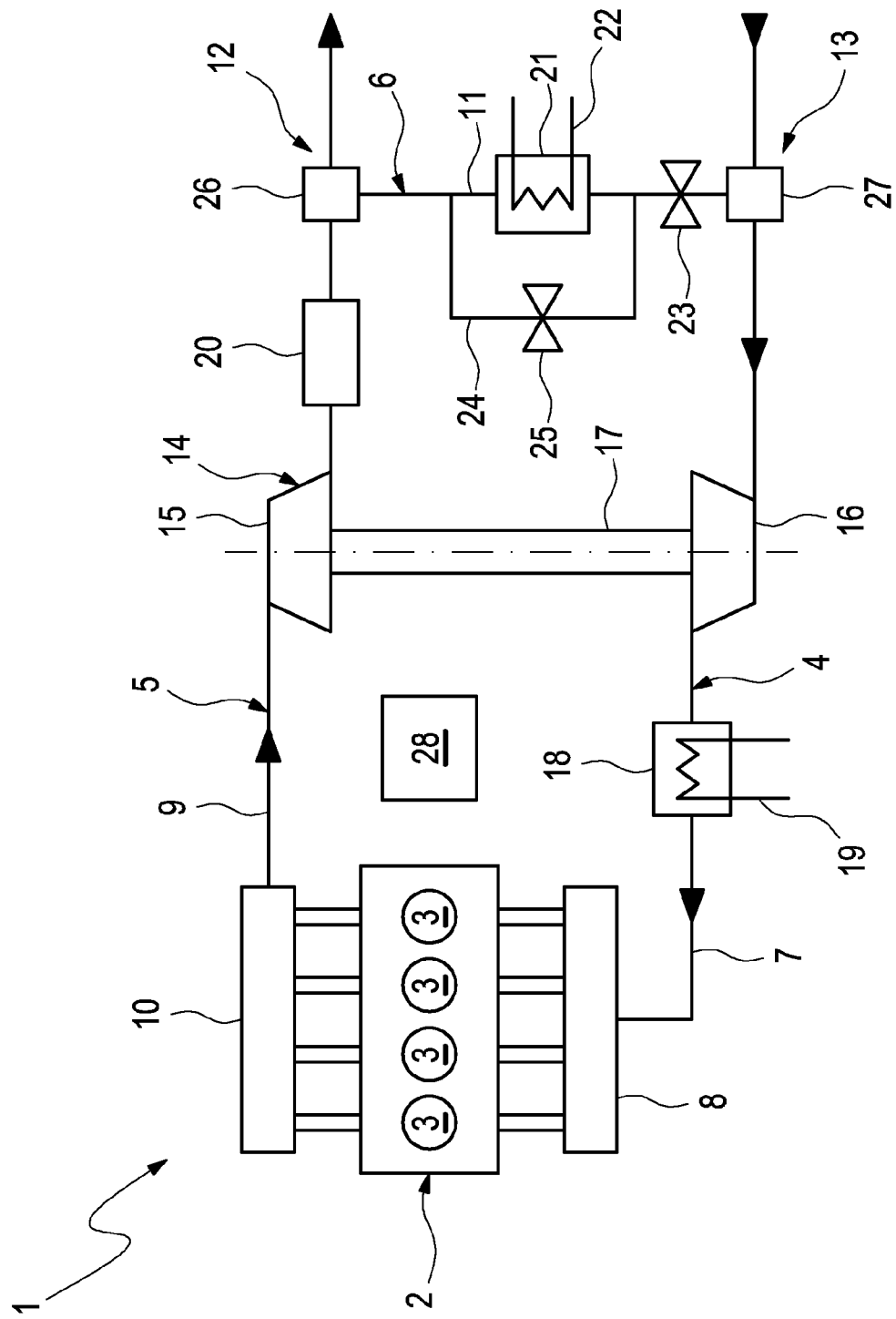
FIG. 1 shows a greatly simplified diagram-like principal illustration of an internal combustion engine system.

According to FIG. 1, an internal combustion engine system 1, which preferably can be used in a motor vehicle, comprises an internal combustion engine 2 which preferably can involve a piston engine with cylinders 3. Furthermore, the internal combustion engine system 1 has a fresh air system 4, an exhaust gas system 5 and an exhaust gas recirculation system 6. The fresh air system 4 serves for supplying fresh air to the internal combustion engine 2 and has a fresh air line 7 and a fresh air distributor 8 which distributes the fresh air supplied by the fresh air line to the individual cylinders 3. The exhaust gas system 5 serves for discharging exhaust gas from the internal combustion engine 2 and, for this purpose, has an exhaust gas line 9 which is connected to an exhaust gas manifold 10 which collects the exhaust gas coming from the cylinders 3 and supplies it to the exhaust gas line 9. The exhaust gas recirculation system 6 has an exhaust gas recirculation line 11. The exhaust gas recirculation system 6 serves for recirculating exhaust gas from the exhaust gas system 5 to the fresh air system 4. For this purpose, the recirculation line 11 is connected via a removal point 12 to the exhaust gas line 9, whereby exhaust gas from the exhaust gas system 5 can enter into the recirculation line 11. Furthermore, the recirculation line 11 is connected via an introduction point 13 to the fresh air line 7, whereby the recirculated exhaust gas can enter into the fresh air system 4.

Moreover, in the shown example, an exhaust gas turbocharger 14 is provided, the turbine 15 of which is arranged in the exhaust gas line 9 and the compressor 16 of which is arranged in the fresh air line 7. Turbine 15 and compressor 16 or, respectively, a non-shown turbine wheel are connected to each other via a common drive shaft 17. In the fresh air line 7, downstream of the compressor 16, an intercooler 18 is arranged which is connected to a cooling circuit 19 which may be the cooling circuit of the internal combustion engine 2. Downstream of the turbine 15 and upstream of the removal point 12, a particle filter 20 is arranged in the exhaust gas line 9.

Furthermore, the exhaust gas recirculation system 6 can have an exhaust gas recirculation cooler 21 which can be connected to a cooling circuit 22 which may also be the cooling circuit of the internal combustion engine 2. The exhaust gas recirculation cooler 21 is arranged in the recirculation line 11. Further, the recirculation line 11 includes an exhaust gas recirculation valve 23 for controlling an exhaust gas recirculation rate or for blocking the recirculation line 11. In the example, the exhaust gas recirculation valve 23 is arranged downstream of the exhaust gas recirculation cooler 21 in the recirculation line 11. Also provided in the example is a bypass 24 for bypassing the exhaust gas recirculation cooler 21, which bypass can be controlled by means of a bypass valve 25. In particular during a cold start of the internal combustion engine 1 it can be necessary to recirculate un-cooled exhaust gas to bring the internal combustion engine 2 faster to operating temperature.

The exhaust gas recirculation system 6 comprises further an exhaust gas valve assembly 26 and a fresh air valve assembly 27. The exhaust gas valve assembly 26 is arranged on the exhaust gas side in the region of the removal point 12 and is configured in such a manner that a removal flow entering from the exhaust gas line 9 into the recirculation line 11 can be controlled therewith. In contrast to this, the fresh air valve assembly 27 is configured such that an introduction flow entering from the recirculation line 11 into the fresh air line 7 can be controlled therewith.

Both valve assemblies 26, 27 are permanently displaceable between a first position and a second position. They can be configured in particular as fast-switching valve assemblies which, within short switching times which can be smaller than 10 ms and which can lie in particular in the range of the switching times of gas exchange valves of the internal combustion engine 2, allow a switching between the switching positions or switching states. This allows in particular a synchronization with the speed of the internal combustion engine 2 which, however, must not always be the case.

Figure 2:
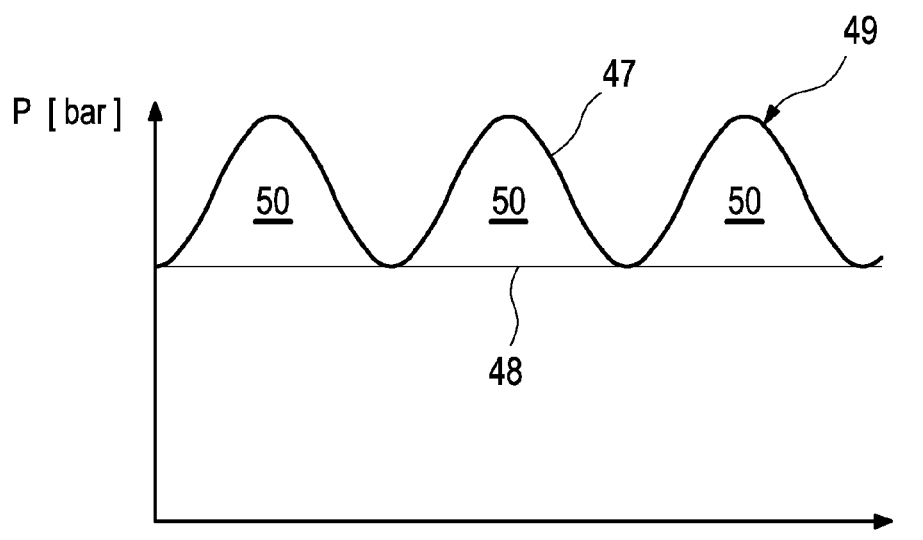
FIG. 2 shows different diagrams a-c for illustrating pressure curves.
Figure 2:
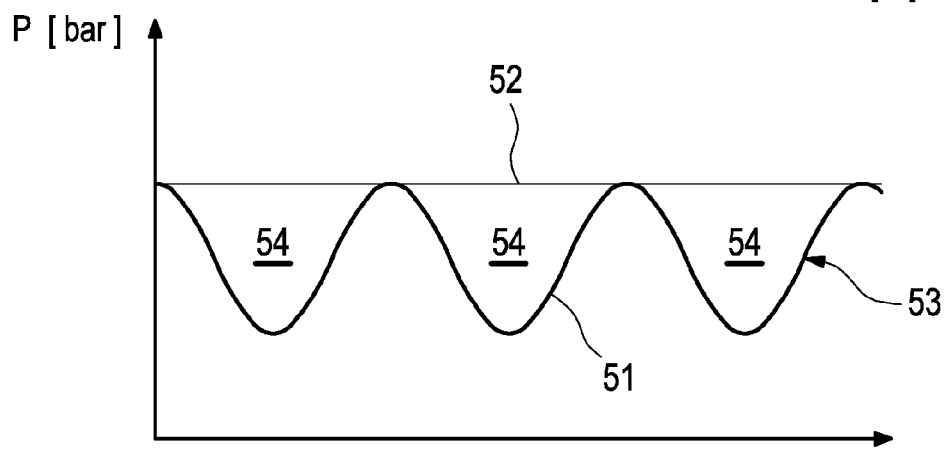
Figure 2:
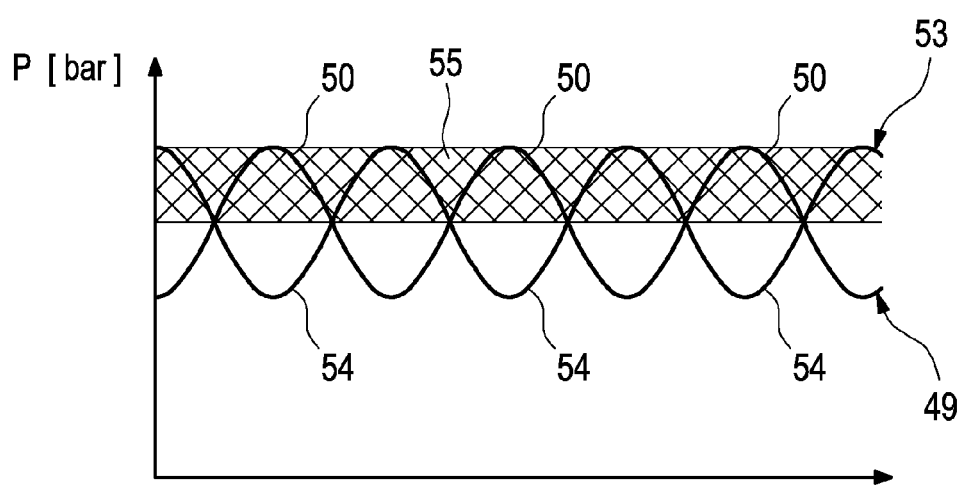

Accordingly, the exhaust gas valve assembly 26 according to FIG. 2a is configured in such a manner that it can be permanently displaced between a first position and a second position thereby generating the removal flow. The first position is designed such that due to the first position, a pressure 47 in the exhaust gas line 9 increases at the removal point 12 with respect to an initial exhaust gas pressure 48. In contrast to this, the second position is designed such that the pressure 47 in the exhaust gas line 9 drops again at the removal point 12 to the initial exhaust gas pressure 48. Thus, the exhaust gas valve assembly 26 can generate a pulsed removal flow 49, wherein individual positive pressure pulses 50 with a pressure that is increased with respect to the initial exhaust gas pressure 48 follow each other at spaced time intervals. The first position can correspond to a closed position or a partially closed position, while the second position corresponds to an open position.

Analog to this, the fresh air valve assembly 27 according to FIG. 2b is configured in such a manner that, for generating the introduction flow, it can be permanently displaced between a first position and a second position, wherein in this case, in the first position, a pressure 51 in the fresh air line 7 decreases at the introduction point 13 with respect to an initial fresh air pressure, while in the second position, the pressure increases again at the introduction point 13 to the initial fresh air pressure 52. Accordingly, the fresh air valve assembly 27 can generate a pulsed introduction flow 53, wherein individual negative pressure pulses 54 with a pressure that is decreased with respect to the initial fresh air pressure 52 follow each other at spaced intervals. The first position can correspond to a closed or a partially closed position, while the second position corresponds to an open position.

The valve assemblies 26, 27 can be actuated by means of control device 28 indicated in FIG. 1 which is coupled to the valve assemblies 26, 27 in a suitable manner. According to FIG. 2c, said control device 28 can synchronize the valve assemblies 26, 27 with respect to their actuations in order to adapt a temporal phase position of the pulsed removal flow 49 to the pulsed introduction flow 53. Instead of such an electronic synchronization via the control device 28, a mechanical coupling between the valve assemblies 26, 27 is also conceivable which also results in the desired synchronization. A corresponding synchronization coupling is indicated in the FIGS. 2 and 3 by a broken line and is designated with 29.

In any case, the valve assemblies 26, 27 according to FIG. 2c are synchronized in such a manner that the pressure pulses 50 entering at the removal point 12 into the recirculation line 11 meet the negative pressure pulses 54 at the introduction point 13. The synchronization takes place such that in the region of the introduction point 13, the pressure drop on the fresh air side generated by the negative pressure pulses 54 is more or less compensated by the introduced positive pressure pulses 50. A pressure band 55 with reduced pressure fluctuations develops. Consequently, the pressure fluctuations on the fresh air side can be significantly reduced. This results in particular in a reduced load due to a more uniform flow to the compressor 16.

Figure 3:
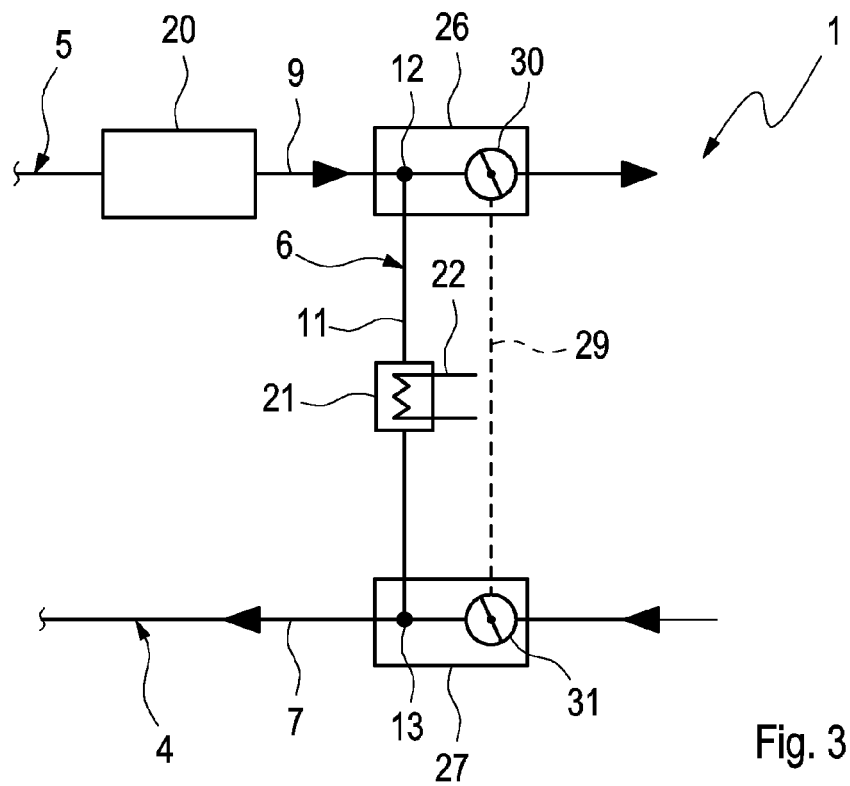
FIGS. 3 and 4 show views as in FIG. 1 in the region of an exhaust gas recirculation system for different embodiments.

In the embodiment shown in FIG. 3, the exhaust gas valve assembly 26 is configured as shut-off valve, the valve member 30 of which reduces or blocks the penetratable cross-section of the exhaust gas line 9 in the first position and releases it in the second position. For example, the valve member 30 can involve a butterfly valve flap which rotates in the penetratable cross-section of the exhaust gas line 9. Correspondingly, the fresh air valve assembly 27 can also involve a shut-off valve, the valve member 31 of which, in particular a flap, preferably a butterfly valve flap, is arranged upstream of the introduction point 13 in the fresh air line 7 and which, in the first position, reduces or blocks the penetratable cross-section of the fresh air line 7 and which, in the second position, releases the penetratable cross-section of the fresh air line 7. In the embodiment shown in FIG. 3, the positive pressure pulses on the exhaust gas side thus can be generated by alternatingly opening and reducing or blocking the penetratable cross-section of the exhaust gas line 9. The exhaust gas valve assembly 26 generates here adequate short-time back pressures in the exhaust gas line 9.

Analog to this, the negative pressure pulses are generated by alternatingly reducing or blocking and opening the fresh air line 7. Hereby, the fresh air valve assembly 27 generates corresponding short-time pressure decreases in the fresh air line 7. Hereby it is possible, on the exhaust gas side and the fresh air side, to directly generate pressure pulsations in the exhaust gas line 9 and in the fresh gas line 7, respectively.

Figure 4:
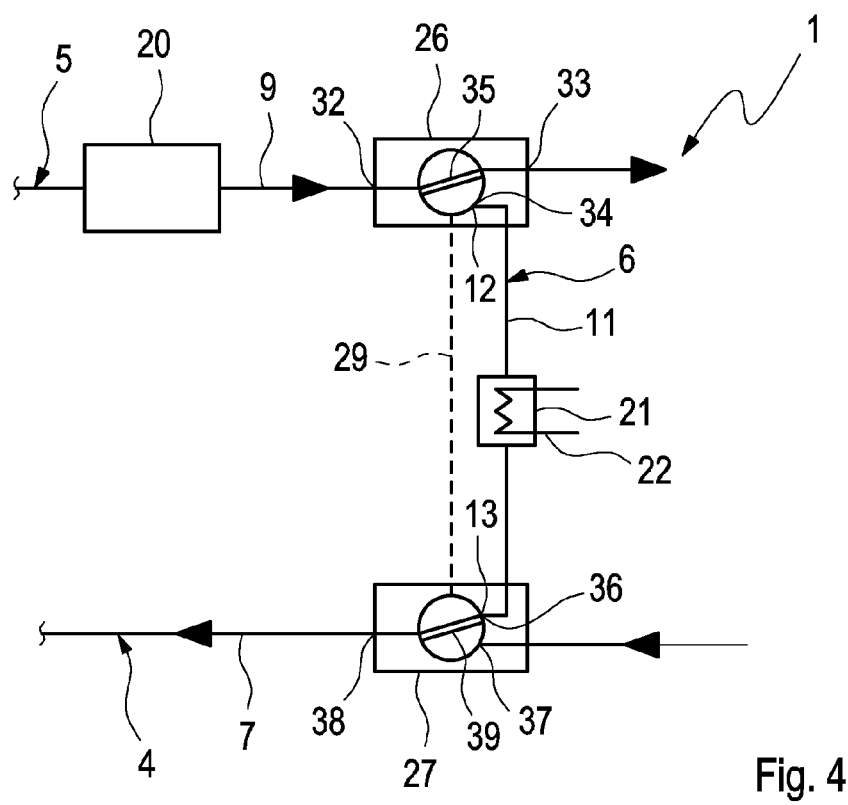

In the embodiment shown in FIG. 4, the exhaust gas valve assembly 26 is configured as 3/2 directional control valve. Accordingly, it has three ports and at least two switching positions. The three ports are one exhaust gas inlet 32, one exhaust gas outlet 33 and one recirculation outlet 34 which, at the same time, forms the removal point 12. The exhaust gas line 9 is connected to the exhaust gas inlet 32 and the exhaust gas outlet 33, while the recirculation line 11 is connected to the recirculation outlet 34. A valve member 35 connects in the second position the exhaust gas inlet 32 to the exhaust gas outlet 33 and blocks the recirculation outlet 34. In the first position, the valve member 35 connects the exhaust gas inlet 32 to the recirculation outlet 34 and reduces or blocks the exhaust gas outlet 33. It is principally conceivable that the exhaust gas valve assembly 26 blocks the exhaust gas outlet 33 completely in the first position. In addition, also possible are any intermediate positions which are specified or fixed in particular with respect to the degree of opening, wherein in said intermediate positions, a more or less large partial flow of exhaust gas is redirected to the recirculation line 11 and the respective residual flow is supplied to the exhaust gas outlet 33.

Furthermore, the fresh air valve assembly 27 too can be configured as 3/2 directional control valve which has three ports and at least two positions. The three ports are one recirculation inlet 36 which, at the same time, forms the introduction point 13, one fresh air inlet 37 and one fresh air outlet 38. The recirculation line 11 is connected to the recirculation inlet 36. The fresh air line 7 is connected to the fresh air inlet 37 and the fresh air outlet 38. A valve member 39 allows again a coupling of the fresh air outlet 38 either to the recirculation inlet 36 or to the fresh air inlet 37 or also virtually any intermediate positions with a partitioning, wherein a first portion of the gas flow exiting the fresh air outlet 38 is formed by the recirculated exhaust gas, while the rest is formed by fresh air. Accordingly, in the first position, the fresh air valve assembly 27 can reduce or block the fresh air inlet 37 connected to the fresh air line 7 and can open the recirculation inlet 36 connected to the recirculation line 11. In the second position, the fresh air valve assembly 27 opens the fresh air inlet 37 and blocks the recirculation inlet 36.

In the embodiment shown in FIG. 4, the exhaust gas valve assembly 26 generates the positive pressure pulses by alternatingly redirecting at least a portion of the exhaust gas flow from the exhaust gas line 9 into the recirculation line 11. Through said alternating, short-time and temporary redirecting, pulsations are created in the exhaust gas pressure, which pulsations result in the pulsed introduction flow. Accordingly, the fresh air valve assembly 27 can generate the negative pressure pulses by alternatingly replacing at least a portion of the fresh air flow in the fresh air line 7 with recirculated exhaust gas. Through said short-time and temporary replacing of at least a portion of the fresh air flow, a pressure pulsation is generated in the fresh air, which pulsation results in the desired pulsed/virtually constant introduction flow consisting of fresh air and exhaust gas "packages".

The synchronization between the two valve assemblies 26, 27 considers in particular the running length of the pressure pulsation in the recirculation line 11 to get from the removal point 12 to the introduction point 13. Moreover, the synchronization can also consider the characteristic of the release of the cross-section or, respectively, the blocking of the cross-section in the region of the removal point 12 and/or in the region of the introduction point 13. Here, a decoupling of the valve speed/switching frequency from the engine speed is possible, i.e., the tuning can take place with respect to the resonant tube effects in the EGR line.

The valve assemblies 26, 27 of the FIGS. 3 and 4 can be configured as switching valves, the valve members 30, 31 and 35, 39, respectively, can be switched between end positions which form the first position and the second position. Alternatively, the end positions of the valve members 30, 31, 35, 39 can represent a particular partial opening/partial closing. Alternatively, it is also possible to configure the valve assemblies 26, 27 as rotary valves, the valve members 30, 31, and 35, 39, respectively, run through closing phases which form the first position and opening phases which form the second position. Also, combinations are conceivable in which the one valve assembly 26, 27 is configured as switching valve while the other valve assembly 26, 27 is configured as rotary valve.

The illustrations of the valve assemblies 26, 27 and their valve members 30, 31 and 35, 39, respectively, in the FIGS. 3 and 4 are merely exemplary and are to be understood in a functional rather than a constructional manner.

Figure 5:
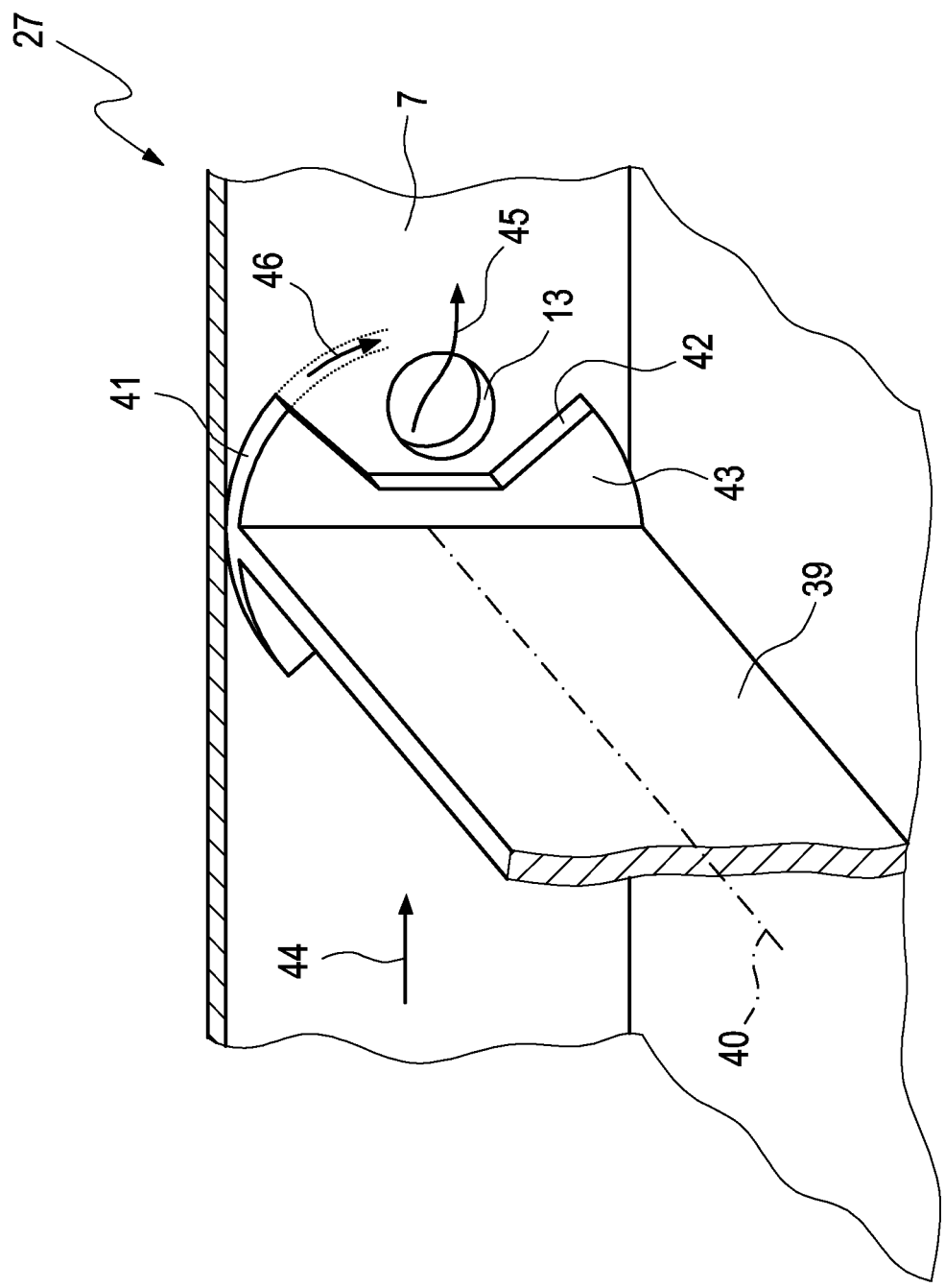
FIG. 5 shows a greatly simplified perspective partial sectional view of a fresh air valve assembly.

According to FIG. 5, an exemplary embodiment of the fresh air valve assembly 27 configured as rotary valve can have a flap-shaped valve member 39 which is rotatably displaceable in a cross-section of the fresh air line 7 about an axis 40 of rotation. Through the rotation of the valve member 39, the penetratable cross-section of the fresh air line 7 is blocked or more or less opened depending on the rotational position of the valve member 39. In this embodiment, the introduction point 13 is arranged in the proximity of the valve member 39 in such a manner that a control disk 41 formed on the front end of the valve member 39 can control the penetratable cross-section of the introduction position 13. The control disk 41 has at least one recess 42 at the edge, wherein the recess releases the introduction point 13 when passing over the latter. Further, the control disk 41 has at least one closing section 43 which closes the introduction point 13 when passing over the latter. By an adequate positioning and adjustment of the control disk 41 with respect to the valve member 39, the removal point 13 can always be opened when the penetratable cross-section of the fresh air line 7 is more or less blocked. In FIG. 5, a fresh gas flow is indicated by an arrow 44. An exhaust gas recirculation flow or, respectively, an introduction flow is indicated by an arrow 45. The rotation of the valve member 39 or, respectively, control disk 41 is indicated by an arrow 46. The exhaust gas valve assembly 26 can principally have a corresponding structure.

According to a particularly advantageous embodiment, the control device 28 can be configured such that it can deactivate the valve assemblies 26, 27, if necessary, namely in a rest position in which, on the one hand, the recirculation line 11 is blocked and, on the other, the exhaust gas line 9 and the fresh air line 7 are (completely) opened. Such a deactivation of the valve assemblies 26, 27 can be required for certain operating states of the internal combustion engine 2. For example, during a full load operation of the internal combustion engine 2, an exhaust gas recirculation may be undesired to be able to supply as much fresh air as possible to the internal combustion engine 2. Also, during the transient operation of the internal combustion engine 2, operating states can occur which show increased power requirements and therefore need more fresh air and less or no recirculated exhaust gas. Also, exhaust gas after-treatment systems, which can be included in the exhaust gas system 5, can have operating states which require as much exhaust gas as possible and/or particularly high temperatures, whereby an exhaust gas recirculation can be disadvantageous. Such operating states of the exhaust gas system 5 can occur, for example, during regeneration of individual exhaust gas treatment systems such as, e.g., particle filters and storage catalytic converters.

The invention claimed is:

1. An internal combustion engine system, comprising:
a turbine;
a compressor connected to the turbine via a common shaft;
a fresh air system;
an exhaust gas system; and
an exhaust gas recirculation system, wherein the exhaust gas recirculation system has an exhaust gas valve assembly for controlling a removal flow of an exhaust gas, which enters at a removal point from an exhaust gas line of the exhaust gas system into a recirculation line of the exhaust gas recirculation system, wherein the exhaust gas recirculation system has a fresh air valve assembly for controlling an introduction flow, which enters at an introduction point from the recirculation line into a fresh air line of the fresh air system, wherein the exhaust gas valve assembly is permanently displaceable between a first position and a second position for generating the removal flow, the first position increases the pressure in the exhaust gas line at the removal point with respect to an initial exhaust gas pressure, and the second position decreases the pressure of the exhaust gas in the exhaust gas line at the removal point to the initial exhaust gas pressure so that positive pressure pulses with a pressure which is increased with respect to the initial exhaust gas pressure follow each other, wherein the fresh air valve assembly is permanently displaceable between a first position and a second position for generating the introduction flow, the first position decreases the pressure in the fresh air line at the introduction point with respect to an initial fresh air pressure and the second position increases the pressure in the fresh air line at the introduction point to the initial fresh air pressure so that negative pressure pulses with a pressure which is decreased with respect to the initial fresh air pressure follow each other, wherein the valve assemblies are synchronized such that the positive pressure pulses entering at the removal point into the recirculation line meet the negative pressure pulses at the introduction point; and
wherein an inlet to the compressor is configured to receive the fresh air after passing through the fresh air valve assembly;
wherein the fresh air valve assembly is a flap-shaped valve member that is rotatably displaceable in a cross section of the fresh air line;
wherein the flap-shaped valve member includes a control disk disposed on an end of the valve member; and
wherein the control disk has an edge with a recess formed therein, and the recess is configured to pass over the introduction point in the fresh air line to permit the exhaust gas to pass through the introduction point and into the fresh air line.

2. The internal combustion engine system according to claim 1, wherein the fresh air valve assembly is configured as a shut-off valve, the valve member of which, in the first position, reduces or blocks the penetratable cross-section of the fresh air line upstream of the introduction point and releases the same in the second position.

3. The internal combustion engine system according to claim 1, wherein at least one of the valve assemblies is configured as a switching valve, the valve member of which is switched between end positions, which form the first position and the second position.

4. The internal combustion engine system according to claim 1, wherein at least one of the valve assemblies is configured as a rotary valve, the valve member of which runs through closing phases forming the first position and opening phases forming the second position.

5. The internal combustion engine system according to claim 1, wherein the turbine is configured to receive the exhaust gas from the internal combustion engine and prior to the removal flow of the exhaust gas entering the removal point of the exhaust gas system.

6. The internal combustion engine according to claim 1, wherein when the exhaust gas valve assembly is in the first position, all exhaust gas flows to the fresh air valve assembly through the exhaust gas valve assembly.

7. The internal combustion engine according to claim 6, wherein when the fresh air valve assembly is in the first position and when the exhaust gas valve assembly is in the first position, all exhaust gas flows from the exhaust gas valve assembly to the fresh air line and the fresh air valve assembly blocks the fresh air upstream of the fresh air valve assembly from flowing to the internal combustion engine.

8. The internal combustion engine system of claim 1, wherein the control disk further includes at least one closing section that closes the introduction point when the at least one closing section passes over the introduction point.

9. A method for operating an internal combustion engine system, comprising:
supplying fresh air through a fresh air system to an internal combustion engine;
discharging exhaust gas from the internal combustion engine through an exhaust gas system;
recirculating an exhaust gas through an exhaust gas recirculation system to the fresh air system via an exhaust gas recirculation valve;
connecting a recirculation line of the exhaust gas recirculation system in the region of a removal point from an exhaust gas line of the exhaust gas system;
generating pressure pulsations in the exhaust gas by an exhaust gas valve assembly, wherein during said pressure pulsations, positive pressure pulses follow each other, which have an increased pressure with respect to an initial exhaust gas pressure;
connecting the recirculation line in the region of an introduction point to a fresh air line of the fresh air system, wherein pressure pulsations are generated in the fresh air by a fresh air valve assembly, wherein during said pressure pulsations, negative pressure pulses follow each other, which have a reduced pressure with respect to an initial fresh air pressure, the pressure pulsations are adapted to each other such that the positive pressure pulses meet the negative pressure pulses in the region of the introduction point; and
passing the fresh air to a compressor after the fresh air has passed the introduction point; and
wherein the exhaust gas valve assembly is positionable between a first position and a second position, and when in the first position, the exhaust gas valve assembly passes the exhaust gas therethrough and to the fresh air system;
wherein the fresh air valve assembly is a flap-shaped valve member that is rotatably displaceable in a cross section of the fresh air line;
wherein the flap-shaped valve member includes a control disk disposed on an end of the valve member; and
wherein the control disk has an edge with a recess formed therein, and the recess is configured to pass over the introduction point in the fresh air line to permit the exhaust gas to pass through the introduction point and into the fresh air line.

10. The method according to claim 9, further comprising generating the positive pressure pulses by at least one of alternatingly opening and reducing, and alternatingly blocking the exhaust gas line downstream of the removal point; and redirecting alternatingly at least a portion of the exhaust gas flow from the exhaust gas line into the recirculation line to generate the positive pressure pulses.

11. The method according to claim 9, further comprising generating the negative pressure pulses by at least one of alternatingly reducing and blocking, and alternatingly opening the fresh air line upstream of the introduction point; and replacing temporarily at least a portion of the fresh air flow in the fresh air line with recirculated exhaust gas to generate the negative pressure pulses.

12. The method according to anyone claim 9, further comprising selecting a synchronization frequency independently of the engine speed such that pressure vibrations are excited in the exhaust gas recirculation line.

13. The method according to claim 9, further comprising preventing a recirculation of exhaust gas, wherein at least one of the exhaust gas valve assembly and the fresh air valve assembly closes the recirculation line at at least one of a standstill and a deactivation of the at least one of the valve assemblies.

14. The internal combustion engine system according to claim 1, wherein the exhaust gas valve assembly is configured as a 3/2 directional control valve which, in the first position opens a recirculation outlet connected to the recirculation line and at least one of reduces and blocks an exhaust gas outlet connected to the exhaust gas line and which, in the second position blocks the recirculation outlet and opens the exhaust gas outlet.

15. The internal combustion engine system according to claim 1, wherein the fresh air valve assembly is configured as a 3/2 directional control valve which, in the first position, reduces or blocks a fresh air inlet connected to the fresh air line and opens a recirculation inlet connected to the recirculation line and which, in the second position, opens the fresh air inlet and blocks the recirculation inlet.

16. The method according to claim 9, further comprising:
coupling a compressor to a turbine; and
passing the exhaust gas to the turbine prior to recirculating the exhaust gas through the exhaust gas recirculation system.

17. The method according to claim 9, wherein when the exhaust gas valve assembly is in the second position, the exhaust gas valve assembly prevents the exhaust gas from recirculating to the fresh air system and passes the exhaust gas to an exhaust outlet.

18. The method of claim 9, wherein when the exhaust gas valve assembly is in the first position and when the fresh air valve assembly is in the first position, all exhaust gas flows to the fresh air line of the internal combustion engine.

19. An internal combustion engine system, comprising:
a fresh air system;
a turbine;
a compressor;
an exhaust gas system; and
an exhaust gas recirculation system, wherein the exhaust gas recirculation system has an exhaust gas valve assembly for controlling a removal flow, which enters at a removal point from an exhaust gas line of the exhaust gas system into a recirculation line of the exhaust gas recirculation system, and
wherein the exhaust gas recirculation system has a fresh air valve assembly for controlling an introduction flow, which enters at an introduction point from the recirculation line into a fresh air line of the fresh air system;

wherein the fresh air valve assembly is a flap-shaped valve member that is rotatably displaceable in a cross section of the fresh air line;

wherein the flap-shaped valve member includes a control disk disposed on an end of the valve member;

wherein the control disk has an edge with a recess formed therein, and the recess is configured to pass over the introduction point in the fresh air line to permit the exhaust gas to pass through the introduction point and into the fresh air line;

wherein the exhaust gas valve assembly is displaceable between a first position and a second position for generating the removal flow, the first position increases the pressure in the exhaust gas line at the removal point with respect to an initial exhaust gas pressure, and the second position decreases the pressure in the exhaust gas line at the removal point to the initial exhaust gas pressure so that positive pressure pulses with a pressure which is increased with respect to the initial exhaust gas pressure follow each other; wherein an inlet to the compressor is positioned to receive fresh air from the fresh air valve assembly; and wherein when the exhaust gas valve assembly is in the first position, the exhaust gas recirculation system passes the removal flow therethrough to the fresh air valve assembly.

20. The internal combustion engine system according to claim 19, wherein the fresh air valve assembly is permanently displaceable between a first position and a second position for generating the introduction flow, the first position decreases the pressure in the fresh air line at the introduction point with respect to an initial fresh air pressure and the second position increases the pressure in the fresh air line at the introduction point to the initial fresh air pressure so that negative pressure pulses with a pressure which is decreased with respect to the initial fresh air pressure follow each other.

21. The internal combustion engine system according claim 19, wherein the exhaust gas valve assembly and the fresh air valve assembly are synchronized such that the positive pressure pulses entering at the removal point into the recirculation line meet the negative pressure pulses at the introduction point.

22. The internal combustion engine system according to claim 19, wherein the exhaust gas valve assembly is configured as a shut-off valve, wherein a valve member first position, at least one of reduces and blocks the penetratable cross-section of the exhaust gas line downstream of the removal point and releases the same in a second position, and wherein the exhaust gas valve assembly is configured as a 3/2 directional control valve which, in the first position opens a recirculation outlet connected to the recirculation line and at least one of reduces and blocks an exhaust gas outlet connected to the exhaust gas line and which, in the second position blocks the recirculation outlet and opens the exhaust gas outlet.

23. The internal combustion engine system according to claim 19, wherein the fresh air valve assembly is configured as shut-off valve, the valve member of which, in the first position, reduces or blocks upstream of the introduction point the penetratable cross-section of the fresh air line and releases the same in the second position, and wherein the fresh air valve assembly is configured as a 3/2 directional control valve which, in the first position, reduces or blocks a fresh air inlet connected to the fresh air line and opens a recirculation inlet connected to the recirculation line and which, in the second position, opens the fresh air inlet and blocks the recirculation inlet.

24. The internal combustion engine system according to claim 19, wherein at least one of the valve assemblies is configured as a switching valve, the valve member of which is switched between end positions, which form the first position and the second position.

25. The internal combustion engine system according to claim 19, wherein at least one of the valve assemblies is configured as a rotary valve, the valve member of which runs through closing phases forming the first position and opening phases forming the second position.

26. The internal combustion engine according to claim 19, wherein the turbine is configured to receive the exhaust gas from the internal combustion engine and prior to the removal flow of the exhaust gas entering the removal point of the exhaust gas line.

27. The internal combustion engine system of claim 19, wherein when the exhaust gas valve assembly is in the first position, the exhaust gas valve assembly blocks the removal flow from passing to an exhaust outlet.

28. The internal combustion engine system of claim 19, wherein when the exhaust gas valve assembly is in the first position, and when the fresh air valve assembly is in the first position, all exhaust gas flows to the fresh air line of the internal combustion engine.

* * * * *